(12) United States Patent
Cumings et al.

(10) Patent No.: US 9,926,512 B2
(45) Date of Patent: Mar. 27, 2018

(54) SYSTEMS AND METHODS FOR CLOSED LOOP SOLVENT EXTRACTION AND PURIFICATION

(71) Applicant: MC Machinery, LLC, Denver, CO (US)

(72) Inventors: Derek Cumings, Denver, CO (US); Max Eisler, Longmont, CO (US); Ryan Hubbell, Denver, CO (US)

(73) Assignee: MC Machinery, LLC, Denver, CO (US)

( * ) Notice: Subject to any disclaimer, the term of this patent is extended or adjusted under 35 U.S.C. 154(b) by 0 days.

(21) Appl. No.: 15/163,618

(22) Filed: May 24, 2016

(65) Prior Publication Data

US 2017/0002292 A1    Jan. 5, 2017

Related U.S. Application Data

(60) Provisional application No. 62/187,798, filed on Jul. 1, 2015.

(51) Int. Cl.

| | | |
|---|---|---|
| C11B 1/10 | (2006.01) | |
| B01D 11/02 | (2006.01) | |
| C11B 3/00 | (2006.01) | |
| C11B 3/02 | (2006.01) | |
| C11B 7/00 | (2006.01) | |

(52) U.S. Cl.
CPC ............ *C11B 1/108* (2013.01); *B01D 11/028* (2013.01); *B01D 11/0219* (2013.01); *C11B 1/10* (2013.01); *C11B 3/001* (2013.01); *C11B 3/008* (2013.01); *C11B 3/02* (2013.01); *C11B 7/0075* (2013.01); *B01D 11/0284* (2013.01)

(58) Field of Classification Search
None
See application file for complete search history.

(56) References Cited

U.S. PATENT DOCUMENTS

| | | | | |
|---|---|---|---|---|
| 2,278,647 | A | * 4/1942 | Cyphers | ................... C11B 1/10 202/169 |
| 4,545,940 | A | * 10/1985 | Mutoh | .................. B01D 61/14 554/211 |
| 2011/0133120 | A1 | * 6/2011 | McGhee | ............ B01D 11/0219 252/182.12 |
| 2015/0126757 | A1 | * 5/2015 | Wasserman | ............. C11B 9/025 554/9 |
| 2016/0201009 | A1 | * 7/2016 | Lopez | .................. A61K 36/185 554/9 |
| 2016/0213722 | A1 | * 7/2016 | Jones | ................. B01D 11/0219 |

* cited by examiner

*Primary Examiner* — Yate' K Cutliff
(74) *Attorney, Agent, or Firm* — Zuber Lawler Del Duca LLP

(57) ABSTRACT

Provided herein are systems and methods for the facile extraction and purification of oils from plant material, including cannabis and hemp. The systems and methods herein are versatile, and may utilize a wide range of solvents to extract oils from a variety of plant-based material. Further, the provided systems and methods are closed loop, reducing the loss solvent and decreasing the risk of safety concerns such as human exposure to solvent chemicals or explosion of volatiles. In some embodiments, the systems and methods remove impurities from the extracted oils, for example waxes or other precipitates, and provide a higher purity and higher quality extract.

17 Claims, 11 Drawing Sheets

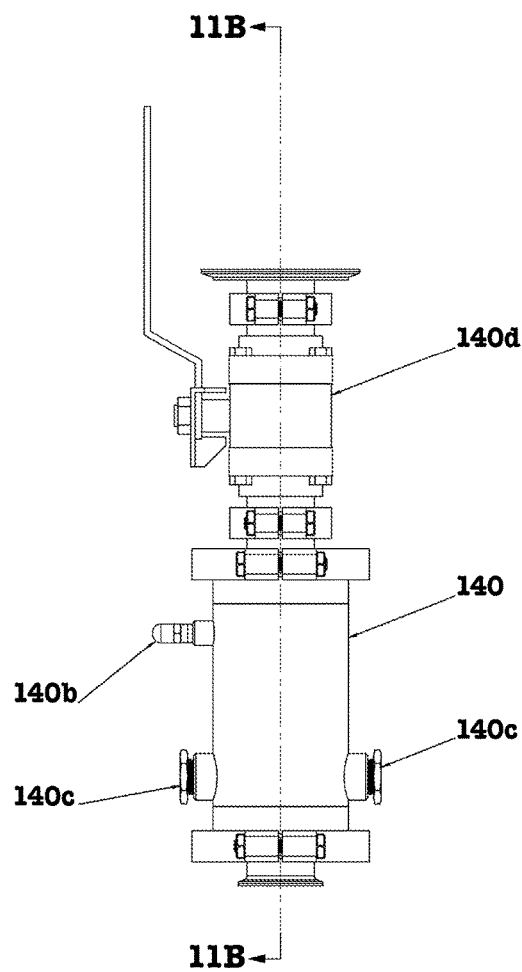
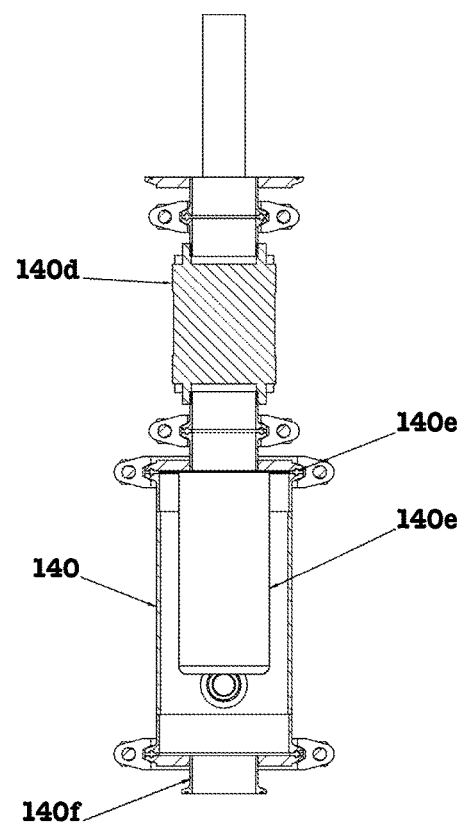
FIG. 11A  FIG. 11B

SYSTEMS AND METHODS FOR CLOSED LOOP SOLVENT EXTRACTION AND PURIFICATION

CROSS-REFERENCE TO RELATED APPLICATIONS

This application claims the benefit of and priority to US Provisional Application No. 62/187,798, filed Jul. 1, 2015, which is hereby incorporated by reference in its entirety to the extent not inconsistent with the disclosure herein.

BACKGROUND OF INVENTION

This invention is in the field of extraction and refining of essential oils from biological material. The invention relates generally to the closed loop extraction of oils from plant matter. The invention also generally relates to the purification of extracted oil to remove unwanted compounds extracted concurrently with the oil, such as waxes.

Oils derived from plant matter are desirable in a wide variety of industries and applications. For example, the fragrance and perfume industries require a variety of essential oils for fragrance compounds. The food industry also extracts specific taste-affecting compounds and flavors from plants. Extraction has been utilized to extract a wide array of compounds such as medicinals, lipids, carotenes, alkaloids, tocopherols, and tocotrienols. More recently with the decriminalization of medical cannabis, and in some states legalization of recreational cannabis, extraction of pharmacologically active compounds from marijuana, such as tetrahydrocannabinol (THC) and cannabidiol (CBD), have received increased attention.

Currently, the most common methods for the extraction of oils from plant materials are solvent extraction and supercritical fluid extraction (SFE). SFE uses supercritical fluids to selectively remove extracts from solids, semisolids and liquids. Both solvent extraction and SFE have been developed using a variety of solvents, for example, carbon dioxide, propane, butane, ethane, ethylene, propane, propylene, cyclohexane, isopropanol, benzene, toluene, p-xylene, chlorotrifluoromethane, trichlorofluoromethane, ammonia and water. Each specific solvent has certain advantages and disadvantages and solvents tend to be selected based on the equipment being used, chemistry of the extract and plant material, safety, government regulations, and cost.

Current methods of SFE and solvent extraction both have disadvantages in the cost or complexity of the equipment required. For example, SFE can involve heating the solvent to tight-tolerance temperatures and pressuring to high pressures, which is both costly and a safety concern. While solvent extraction is often performed at lower temperatures and pressures, current methods often risk exposure to the solvent material which can be toxic, explosive or carcinogenic. Additionally, solvent may be lost between non-interconnected components. Current solvent extraction methods also have selectivity problems, as they often extract additional compounds, such as waxes, which are undesirable in the oil product.

As can be seen by the foregoing, there remains a need in the art for closed loop solvent extraction methods and systems for the extraction of oils from plant material which provide reduced costs, higher safety and increased purification and removal of waxes from the extracted oil.

SUMMARY OF THE INVENTION

Provided herein are systems and methods for the facile extraction and purification of oils from plant material, including hemp or cannabis. The systems and methods herein are versatile, and may utilize a wide range of solvents to extract oils from a variety of plant-based material. Further, the provided systems and methods are closed loop, reducing the loss of solvent and decreasing the risk of safety concerns such as human exposure to solvent chemicals or explosion of volatiles. In some embodiments, the systems and methods remove impurities from the extracted oils, for example, waxes or other precipitates, and provide a higher purity and higher quality extract.

In an aspect, provided is a method for closed loop extraction of oils from plant material, the method comprising the steps of: (i) providing an extraction system comprising: (a) a solvent vessel for containing a solvent; (b) an extraction vessel removably connected to the solvent vessel; and (c) a collection vessel removably connected to the extraction vessel and removably connected to the solvent vessel, wherein the collection vessel is positioned gravitationally lower than the extraction vessel; (ii) filling the solvent vessel with the solvent; (iii) heating the solvent vessel, thereby flowing the solvent from the solvent vessel into the extraction vessel, wherein the solvent extracts oils from the plant material; (iv) heating the extraction vessel; (v) cooling the collection vessel to a temperature lower than a temperature of the solvent vessel, thereby flowing the solvent and oils into the collection vessel; and (vii) heating the collection vessel to evaporate the solvent thereby returning at least a portion of the solvent to the solvent vessel and leaving at least a portion of the oils in the collection vessel.

In embodiments, for example, the solvent flows through the extraction system by a differential pressure between the solvent vessel, the extraction vessel and the collection vessel. In some embodiments, the solvent flows through the extraction system without a pump. In an embodiment, the step of filling the solvent vessel further comprises evacuating the solvent vessel to a substantial vacuum, for example a pressure less than or equal to −25 inches of Mercury, −27 inches of Mercury, −29 inches of Mercury, or optionally, −29.5 inches of Mercury. In an embodiment, for example, the step of evaporating the solvent returns greater than 90%, greater than 95%, or optionally greater than 99% of the solvent to the solvent vessel.

In an embodiment, the method for closed loop extraction of oils from plant material further comprises providing a recovery pump operationally connected the collection vessel to force gas from the collection vessel to the solvent vessel. In an embodiment, the method for closed loop extraction of oils from plant material further comprises: (i) providing a source of inert gas in fluid communication with the solvent vessel; and (ii) flowing the inert gas into the solvent vessel while the solvent is in the extraction vessel to promote the flow of the solvent into the collection vessel. In an embodiment, the inert gas is argon, nitrogen or a combination thereof.

In some embodiments the present invention provides a means for the purification of the extracted oils by the precipitation and removal of impurities such as waxes. Advantageously, the removal of these unwanted compounds increases the potency of the extracted oils as some unwanted compounds may interfere with the absorption or recognition of the desired oil compounds, for example, increasing the pharmacological activity associated with THC or increasing the intensity of fragrance or taste provided by the oils in perfumes or food products, respectively.

In an embodiment, the method for closed loop extraction of oils from plant material of claim 1 further comprises: (i) cooling the collection vessel, thereby solidifying waxes in the at least a portion of the oils; (ii) coupling the collection vessel to a dewaxing vessel, wherein the dewaxing vessel is at a lower temperature than the collection vessel; and (iii) flowing the at least a portion of the oils from the collection vessel to the dewaxing vessel through a filter, thereby removing the solidified waxes. In an embodiment, for example, the filter is a 45 micron or smaller filter, a sock filter, a 4 -micron stainless steel filter, or a combination thereof.

In embodiments, for example, the step of flowing the solvent from the solvent vessel to the extraction vessel is accomplished by heating the solvent vessel to between 20° C. and 40° C., greater than 40° C., and optionally 25° C. and 35° C. and cooling the collection vessel to a temperature below 0° C., −5° C., −10° C., or optionally, −20° C. thereby generating a pressure differential. In embodiments, the step of heating the collection vessel to evaporate the solvent heats the collection vessel to between 20° C. and 40° C., greater than 40° C., or optionally, greater than 50° C. In an embodiment, the step of heating the collection vessel the collection vessel is heated for between 40 and 80 minutes, greater than 60 minutes, or optionally, greater than 90 minutes. In some embodiments, the step of cooling the collection vessel to solidify waxes cools the collection to less than 0° C., −5° C., −10° C., or optionally, −20° C.

In embodiments, the solvent is an alkane, an alkene, an alkyne or a combination thereof. In an embodiment, the solvent is natural gas. In some embodiments, the solvent is ethane, ethene, propane, propene, butane, butene, pentane, pentene or a combination thereof. In an embodiment, for example, the solvent is n-butane.

In an aspect, provided is a method for closed loop extracting and purifying oils and from plant material comprising the steps of: (i) providing an extraction system comprising: (a) a solvent vessel for containing a solvent; (b) an extraction vessel removably connected to the solvent vessel; (c) a collection vessel removably connected to the extraction vessel and removably connected to the solvent vessel, wherein the collection vessel is positioned gravitationally lower than the extraction vessel; (d) a dewaxing vessel removably connected to the collection vessel; and (e) a filter, positioned in between the collection vessel and the dewaxing vessel; (ii) evacuating the solvent vessel to a pressure less than or equal to −25 inches of mercury; (iii) filling the solvent vessel with the solvent; (iv) heating the solvent vessel, thereby flowing the solvent from the solvent vessel into the extraction vessel, wherein the solvent extracts oils from the plant material; (v) heating the extraction vessel; (vi) cooling the collection vessel to a temperature lower than a temperature of the solvent vessel, thereby flowing the solvent and oils into the collection vessel; (vii) heating the collection vessel to evaporate the solvent thereby returning at least a portion of the solvent to the solvent vessel and leaving at least a portion of the oils in the collection vessel; (viii) cooling the collection vessel to less than 0° C. thereby solidifying waxes in the oils; and (ix) cooling the dewaxed vessel to a temperature equal to or lower than the collection vessel, thereby flowing the oils from the collection vessel through the filter to the dewaxed vessel and removing waxes from the oils.

In an aspect, provided is a closed loop extraction system for extracting oils from plant material; the system comprising: (i) a solvent; (ii) a solvent vessel; (iii) an extraction vessel for housing a plant material, the extraction vessel removably connected to the solvent vessel; and (iv) a collection vessel positioned vertically below the extraction vessel and removably connected to the extraction vessel and the solvent vessel; wherein the solvent flows from the solvent vessel to the extraction vessel containing the plant material thereby extracting oils from the plant material; wherein the solvent flows from the extraction vessel to the collection vessel and the solvent is converted to a vapor, separating the solvent from the oils, and the solvent flows from the collection vessel to the solvent vessel thereby completing a closed loop; and wherein the solvent flows by a pressure differential generated by temperature difference between two connected vessels, by gravitational force or by a combination thereof.

In an embodiment, for example, the closed loop extraction system further comprises: (i) a dewaxing vessel removably connected to the collection vessel; and (ii) a filter; wherein the oils are cooled to below 0° C. thereby separating waxes from the oils and flowing the oils from the collection vessel through the filter to the dewaxing vessel, thereby removing the waxes from the oils. In embodiments, at least one of the solvent vessel, the extraction vessel or the collection vessel comprises a liquid sight level. In embodiments, at least one of the solvent vessel, the extraction vessel or the collection vessel comprises a pressure relief valve.

In some embodiments, for example, first a solvent vessel is evacuated to remove any contaminants and is then filled with a solvent. The solvent vessel is then heated to partially volatize the solvent and generate pressure within the vessel. The solvent vessel is then fluidically connected to an extraction vessel containing plant material and the vaporized solvent, driven by a pressure differential, flows into the extraction vessel. Inside the extraction vessel, the solvent interacts with the plant material and extracts oils from the plant material into the solvent. The extraction vessel is cooled or allowed to cool and the solvent is allowed to at least partially condense into a liquid. A collection vessel positioned gravitationally lower than the extraction vessel and is then fluidically connected to the extraction vessel The solvent, now containing oils from the plant material, flows from the extraction vessel to the collection vessel via gravity, a pressure differential (for example, caused by temperature difference) or both. In some embodiments, a filter is placed between the extraction and collection vessels to remove solids, for example loose plant mater. The collection vessel is then fluidically connected to the solvent vessel. Once inside the collection vessel, the oil/solvent mixture is heated and the solvent at least partially vaporizes and is allowed to flow back into the solvent vessel completing a closed loop. Thus, the remaining liquid in the collection vessel is predominately oils extracted from the plant material.

In some embodiments, the oil is next cooled, causing a precipitation of components with higher freezing temperatures, such as waxes. The cooled oil and precipitates then flow through a filter, removing the solid precipitates, and into a dewaxing vessel. Thus, the final oil in the dewaxing vessel is dewaxed, i.e., has higher purity and has at least a portion of the waxes removed.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 11A is an elevation view of a dewax filter. FIG. 11B is a cross sectional view of the filter provided in FIG. 11A taken through cut lines A-A.

DETAILED DESCRIPTION OF THE INVENTION

Figure 1:
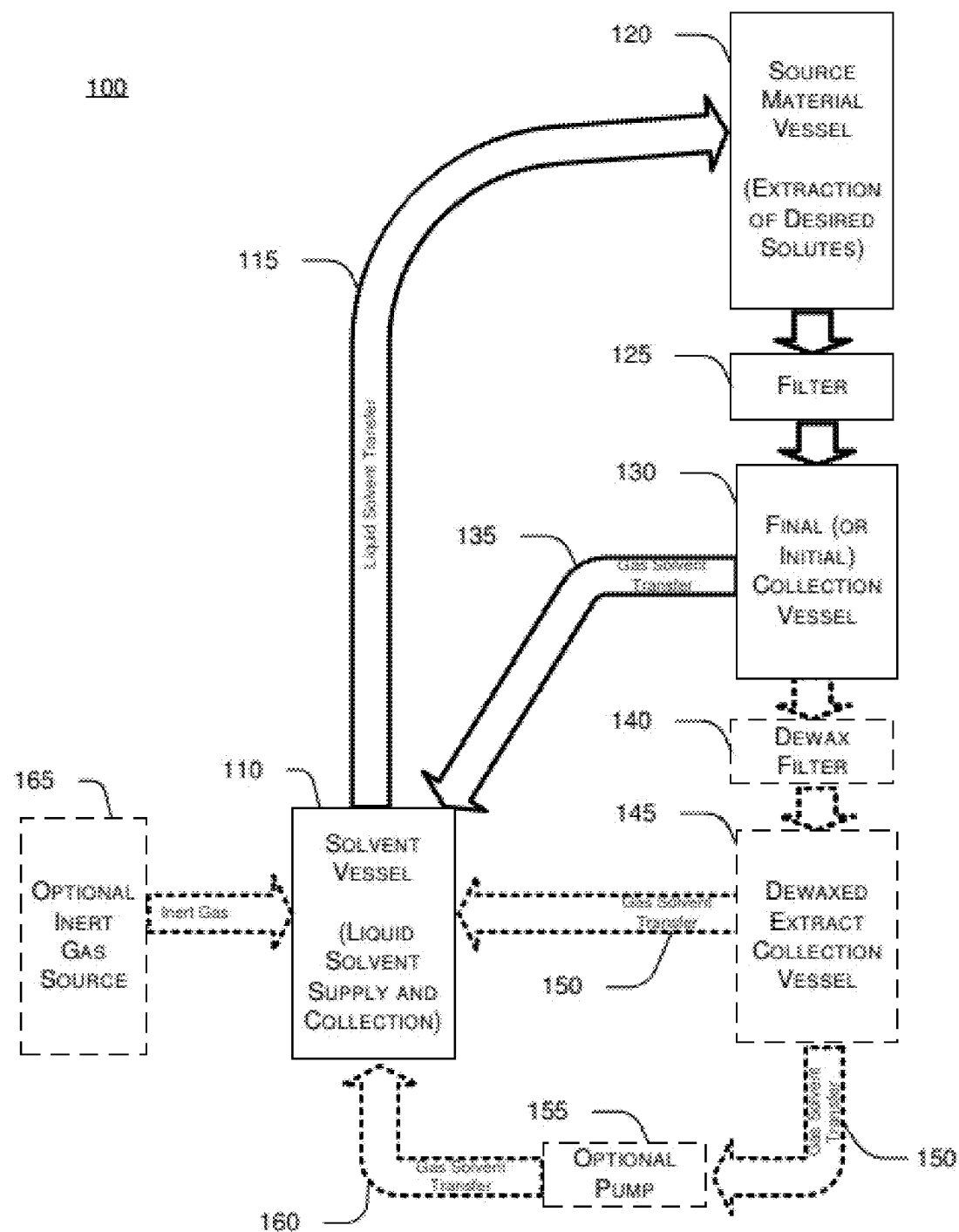
FIG. 1 provides a flow diagram of an embodiment of a system for closed loop extraction of oils from plant material.

In general the terms and phrases used herein have their art-recognized meaning, which can be found by reference to standard texts, journal references and contexts known to those skilled in the art. The following definitions are provided to clarify their specific use in the context of the invention.

"Closed loop" refers to a system which is configured as to not allow material transfer between the system and the external environment and in which a flowing fluid is returned to it point or phase of origination. In an embodiment, for example, the system and methods are closed loop with regards to a solvent. In some embodiments, the systems and methods are not closed loop with respect to the plant material and/or extracted oils. In some embodiments, for example, a solvent is provided in a solvent vessel in the liquid phase and is converted to a gas or fluid phase and transported through the system eventually returning to the solvent vessel, and in some embodiments, condensed back into the liquid phase. In some embodiments, closed refers to excluding material from entering the system during operation, but material may leave the system in certain circumstances such as pressure relief. In some embodiments, more than 80% of the solvent is retained and returned to the solvent vessel for later use. In some embodiments, for example, more than 90%, more than 95%, or optionally, more than 99% of the solvent is retained and returned to the solvent vessel for later use.

"Removably connected" refers to a configuration in which two or more vessels are placed in temporary communication with each other as to pass material, energy, electricity, data or a combination thereof between each other. In some embodiments, removably connected refers to connecting two vessels via a hose to allow fluid communication and material transport between each other. In some embodiment, a hose is used to connect two quick connect valves of two vessels.

"Gravitationally Lower" refers to a physical position in which gravity force directs matter from a higher position. In some embodiments, gravity facilitates the flow of a liquid to a gravitationally lower position. In an embodiment, gravitationally lower refers to positioning a vessel below another vessel so that gravity facilitates the flow of a fluid to the gravitationally lower vessel, for example, between the extraction vessel and collection vessel in the provided systems and methods.

"Plant matter" and "plant material" are used synonymously to refer to any material that is substantially composed of organic material from plants. In some embodiments, plant matter refers to any material containing essential oils and described herein. In some embodiments, plant matter refers to flowers, leaves, herbs, buds, stems or a combination thereof. In some embodiments, for example, plant matter comprises cannabis, or for example, cannabis sativa, cannabis indica or cannabis hemp.

"Essential Oils" and "Oils" are used synonymously to refer to oils extracted from plant material as described herein. In some embodiments, for example, oils refers to hydrophobic liquids containing aromatic or volatile compounds. In some embodiments, oils refers to compounds extracted from cannabis species, for example, tetrahydrocannabinol (THC) including Δ9-THC and Δ8-THC, Δ9-tetrahydrocannabinol propyl analogue, cannabidiol (CBD), cannabidiol propyl analogue, cannabinol, cannabichromene, cannabichromene propyl analogue and cannabigerol.

"Substantial Vacuum" refers to the sufficient absence of internal pressure to enable operability of a provided system or method, for example, to enable flow between a pressured vessel and a vessel under substantial vacuum. In some embodiments, for example, substantial vacuum refers to less than −25 in Hg, −27 in Hg, −29 in Hg, or optionally, −29.5 in Hg. In some embodiments, provided pressure measurements refer to a gauge pressure, i.e., the amount of pressure that would appear on a pressure measuring sensor which may vary with differences in atmospheric pressure. In some embodiments, for example, provided pressure measurements refer to absolute pressure corresponding to the actual pressure within the vessel.

As used herein, the terms "alkene" and "alkene group" are used synonymously and refer to a compound or functional group including a carbon-carbon double bond. Compounds of the invention may have substituted and/or unsubstituted $C_1$-$C_{20}$ alkenes, $C_1$-$C_{10}$ alkenes and $C_1$-$C_5$ alkene groups.

As used herein, the terms "alkyne" and "alkyne group" are used synonymously and refer to a compound or functional group including a carbon-carbon triple bond. Compounds of the invention may have substituted and/or unsubstituted $C_1$-$C_{20}$ alkynes, $C_1$-$C_{10}$ alkynes and $C_1$-$C_5$ alkyne groups.

The invention is further detailed in the following Examples, which are offered by way of illustration and are not intended to limit the scope of the invention in any manner.

EXAMPLE 1

Closed Loop Solvent Extraction

Figure 2:
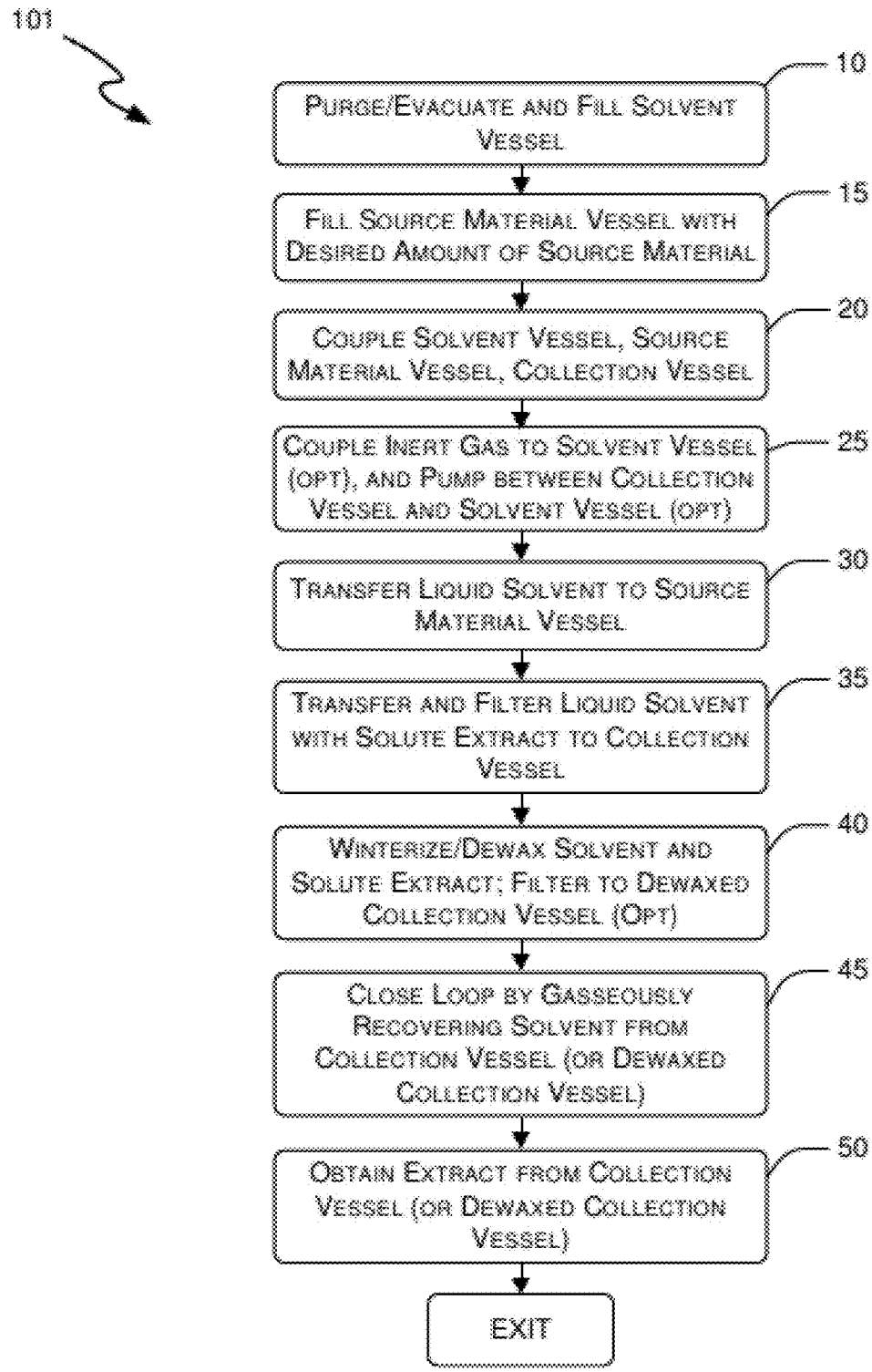
FIG. 2 provides a flow diagram of a method for closed loop extraction of oils from plant material.

FIG. 1 depicts a schematic diagram showing an embodiment of a closed circuit extraction system and FIG. 2 shows a method applied to the schematic. A predetermined amount of liquid solvent is placed within a previously evacuated solvent vessel 110. Any type of liquid solvent that is appropriate for the source material and desired extracts may be utilized. In an embodiment, for example, n-butane is utilized as a solvent for its relatively low cost, general availability, easy liquid and gas phase control, and ability to preserve the desired taste and aroma components (such as terpenes) that are extracted from substances such as cannabis. The source material placed within the extraction vessel 120 (see also FIG. 2, step 15) and is preferentially a ground plant material and may comprise plant matter such as cannabis sativa or hemp. After the source material is placed within the extraction vessel, the solvent vessel 110, extraction vessel 120 and collection vessel 130 are coupled together (FIG. 2, step 25) as shown in the schematic of FIG. 1 with the filter 125 interposed between the extraction vessel 120 and the collection vessel 130. The liquid solvent is then transferred 115 (FIG. 2, step 30) to the extraction vessel 120, where the liquid solvent comes in contact with the source material. The liquid solvent is allowed to remain in contact with the source material in the extraction vessel 120 for some predetermined period of time, as explained below. After the desired exposure time elapses, the liquid solvent along with the solute extract is transferred through filter 125 into a collection vessel 130 (FIG. 2, step 35). In one embodiment, the solvent is evaporated and transferred 135 (FIG. 2, step 45) to the solvent vessel 110 using temperature and pressure differentials to transfer the gaseous solvent to the solvent vessel 110. Chilling the solvent vessel 110 allows the solvent to condense inside and complete a closed loop through the system and leaving behind the extract within the collection vessel. This mode is called a passive mode of extraction, as no direct pumping is required nor are any external inputs required other than temperature changes to components of the system as described below.

In an embodiment of FIG. 1, a dewaxing configuration may be additionally utilized (see FIG. 2, step 40) to further purify the extract taken from the source material. In one embodiment, the collection vessel 130 is chilled to a very low temperature, for example, below 0° C. This allows wax and other substances to precipitate into solids that can be filtered out from the oil in a separate filtration stage 140. The dewaxed collection vessel 145 is coupled to the solvent vessel 110 and gaseous solvent is transferred 150 and condensed within the solvent vessel 110. A purified and dewaxed extract may then be removed from the dewaxed extract collection vessel 145.

An additional embodiment is shown in FIG. 1, wherein an optional recovery pump 155 is coupled between either the collection vessel 130, or the dewaxed collection vessel 145 and back to the solvent vessel 110. This provides a mechanical assist to speed the transfer of the solvent from either collection vessel 130 or 145 to the solvent vessel 110.

Figure 3:
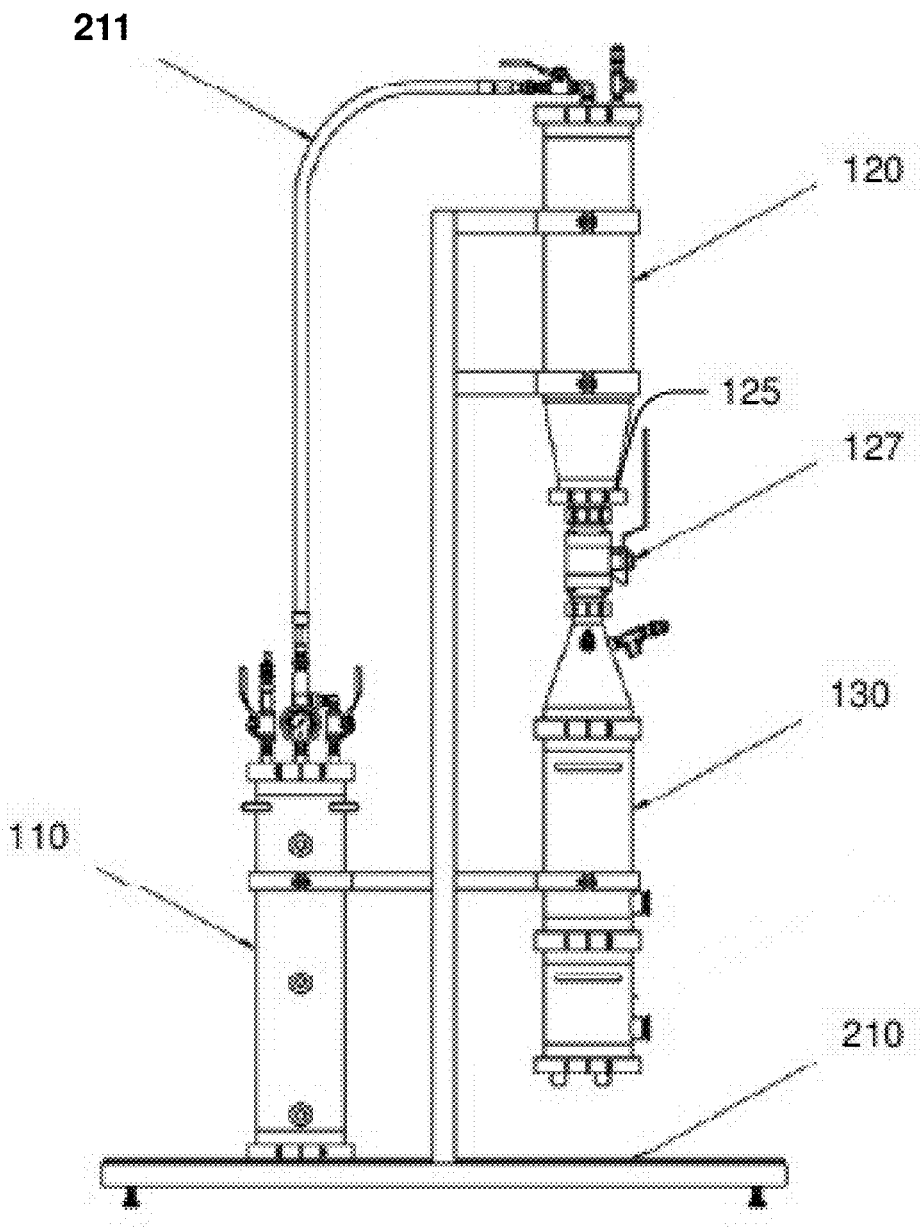
FIG. 3 provides an elevation view of an embodiment of a solvent vessel, an extraction vessel and a collection vessel supported by a frame and arranged to allow gravity to assist in flowing solvent from the extraction vessel to the collection vessel.

FIG. 3 shows an embodiment of a physical unit implementing part of the schematic illustrated in FIG. 1. Frame members 210 secure together the solvent vessel 110 extraction vessel 120 and collection vessel 130 with the collection vessel 130 positioned gravitationally lower than the extraction vessel 120, allowing gravity to assist with transfers of the solvents and solutes from the extraction vessel 120 to the collection vessel 130. A solvent transfer hose 211 is operably positioned between solvent vessel 110 and extraction vessel 120. A filter element 125 is interposed between the extraction vessel 120 and the collection vessel 130, and the flow solvent and solute along with pressure between vessels 120 and 130 may be regulated through the collection valve 127 (also called the main ball valve). Each of the major components of the system is discussed in more detail below.

Figure 4:
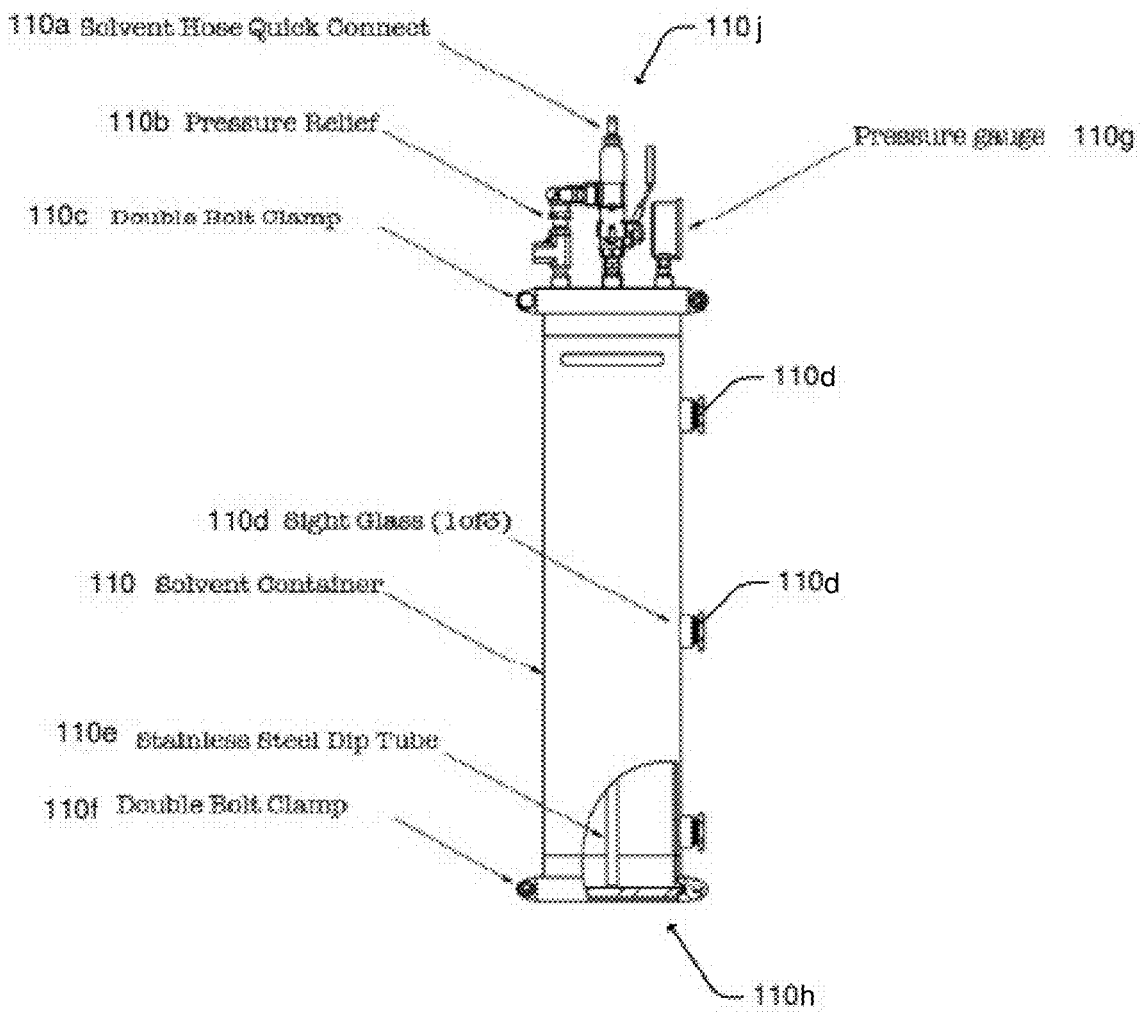
FIG. 4 provides an elevation view of a solvent vessel.

An embodiment of a solvent vessel is shown as an elevation view in FIG. 4, with a cutout at the bottom area 110h showing an internal view with the stainless steel dip tube that approaches the proximity of the bottom of the solvent vessel 110. The solvent vessel 110 has a removable top surface, a solvent hose quick connect 110a where liquid solvent is transferred from the solvent vessel 110 to the extraction vessel. The top of the solvent vessel 110 is equipped with a pressure gauge 110g, and a pressure release 110b to meet safety regulations and to assist with depressurization of the solvent vessel 110 after completion of the extraction process. The solvent vessel 110 is also equipped with one or more sight glasses shown 110d. 110c and 110f make it possible for the interior of the solvent vessel to be accessed and cleaned.

Figure 5A:
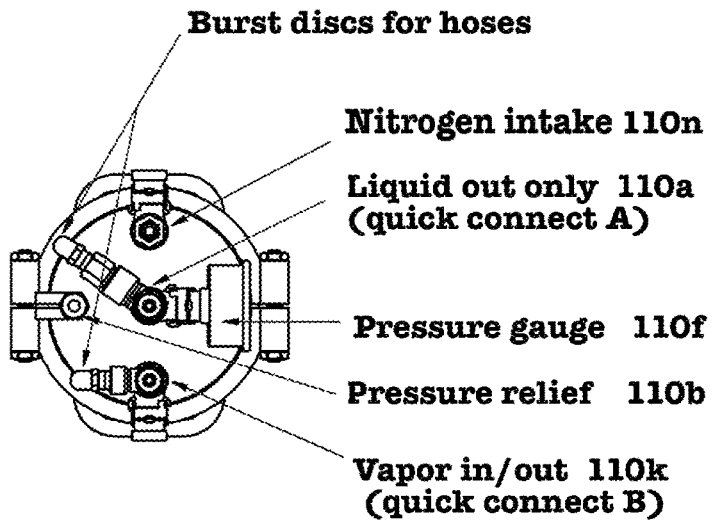
FIG. 5A provides a top view of a solvent vessel.
Figure 5B:
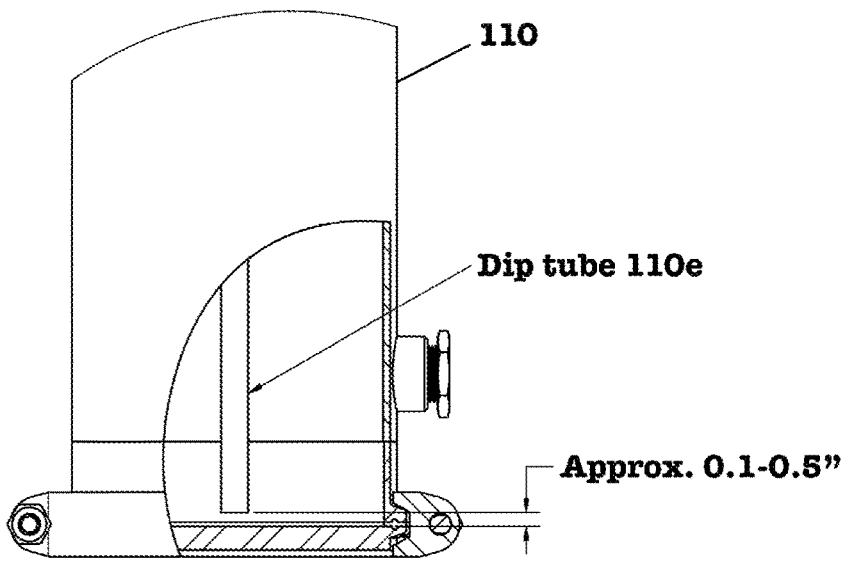
FIG. 5B. Provides a bottom view of the solvent vessel with a cut-away illustrating a dip tube coupled to the liquid output port of the solvent vessel.

FIG. 5A illustrates a top view of the solvent vessel 110. Also shown on FIG. 5A is a nitrogen intake quick release coupling 110n to allow an optional inert gas pressurization of the solvent vessel by accepting pressurized inert gas above the headspace of the liquid solvent contained within the solvent vessel 110. As shown in FIG. 5B, a dip tube 110e is coupled with the solvent hose liquid access port or quick connect 110a, and through its proximity to the bottom of the solvent vessel, such as within the proximity of 0.1-25 inches, liquid solvent is drawn from the bottom of the solvent vessel 110 through the dip tube 110e, even as gaseous solvent or pressurized inert gas fills the headspace above the liquid solvent.

Figure 6:
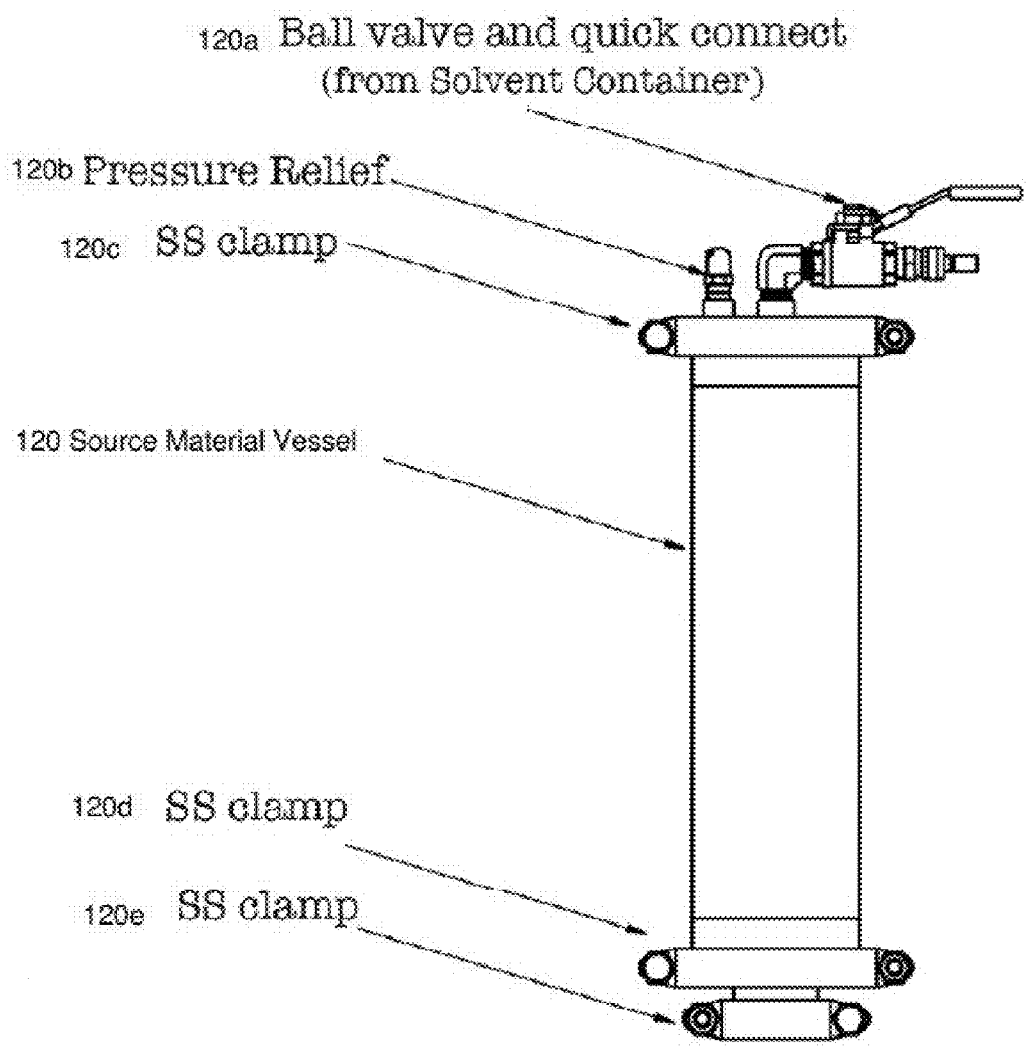
FIG. 6 is an elevation view of an extraction vessel.

FIG. 6 depicts an elevation view of an extraction vessel 120. The top of the vessel 120 shows a ball valve and Quick Connect B 120a that acts as a controllable port for the liquid solvent to enter the extraction vessel. The extraction vessel is equipped with a pressure relief 120b to allow controlled release of excess interior pressures. The extraction vessel also allows access to the interior of the container through the removal of clamps 120c, 120d, and 120e. The internal access allows placing and removing source material, and cleaning of the extraction vessel 120 before or after its use.

Figure 7:
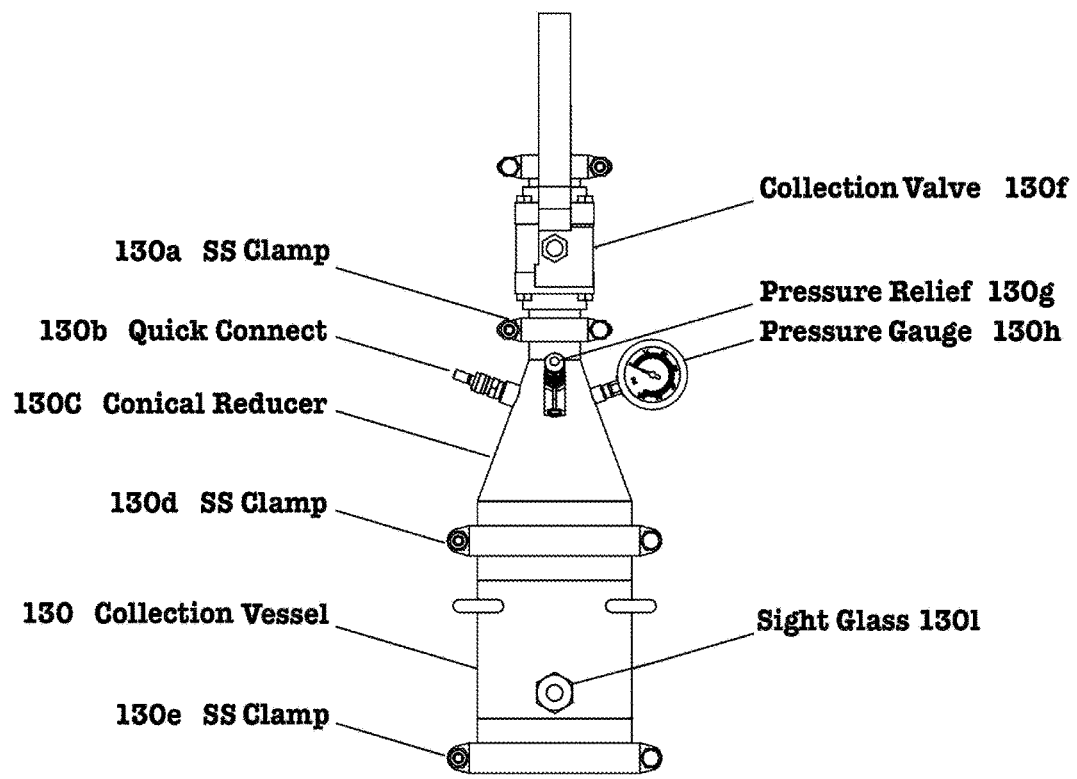
FIG. 7 is an elevation view of a collection vessel.

FIG. 7 illustrates an elevation view of a collection vessel 130. This vessel is also similar to embodiments of the dewaxed extract collection vessel 145 shown in FIG. 1. The collection vessel 130 has a collection valve 130f, in some implementations a ball valve that allows selective access and pressurization of the collection vessel 130. Quick connect 130b allows solvent in a gaseous form to be removed from the collection vessel 130 after the extraction process has occurred. Pressure gauge 130h is provided to allow for monitoring of internal pressures in conformance with process described herein.

Pressure relief 130g allows controlled release of interior pressure of the collection vessel 130 and removal of the clamps 130a or 130e to allow access to the extracts deposited inside.

Figure 8:
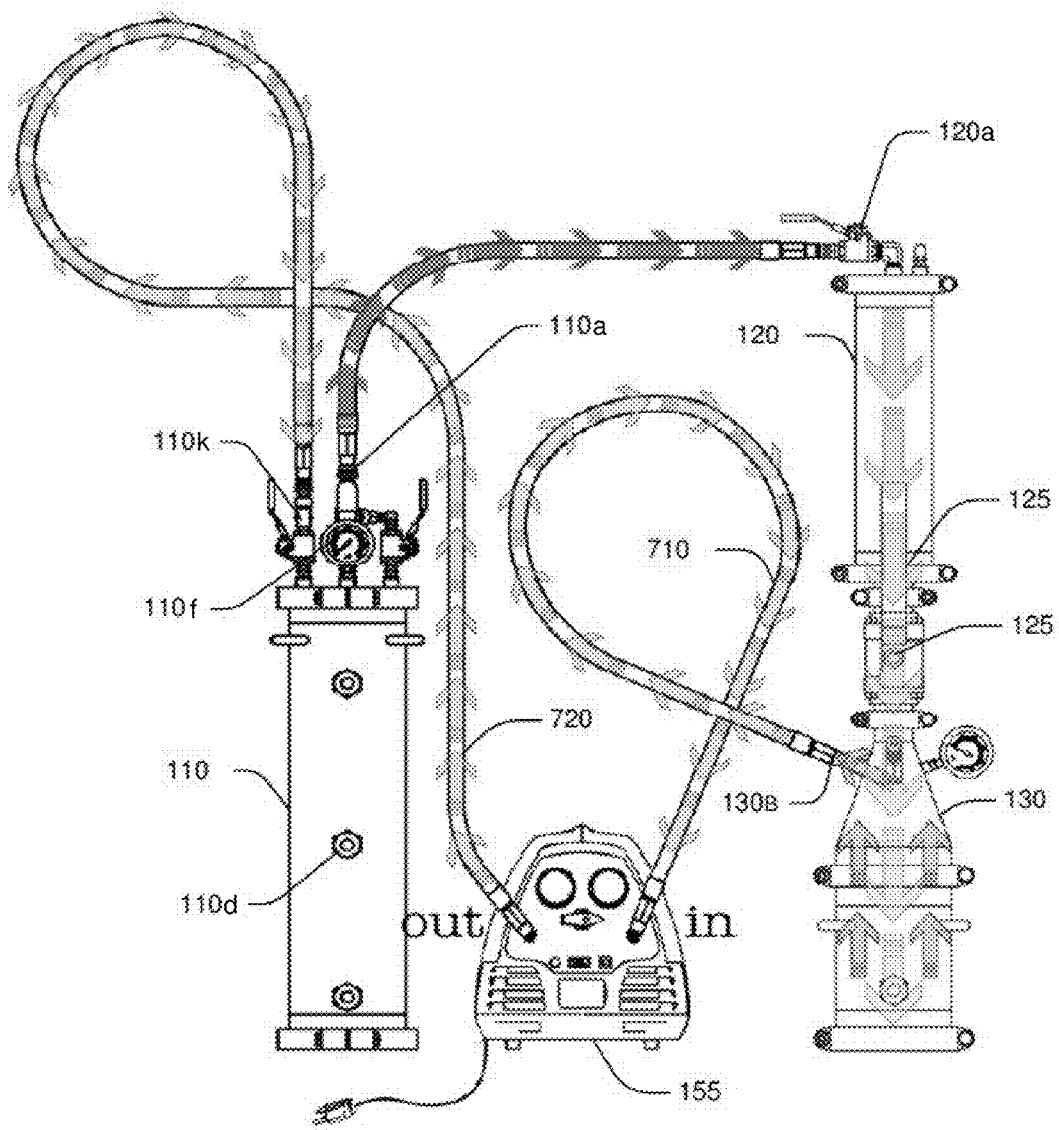
FIG. 8 provides an embodiment of an extraction system including an optional recovery pump coupled between the collection vessel and the solvent vessel.

FIG. 8 shows an embodiment of an extraction system that utilizes a recovery pump 155 to assist in solvent recovery. Recovery pump 155 is coupled between the quick release 130b of the collection vessel 130 through collection hose 710, and to the gas input port quick release 110k of the solvent vessel 110 through hose 720. The arrows shown in the diagram illustrate the closed loop flow of solvent through the system, and after the extraction process is completed, extracts will remain in the bottom of collection vessel 130, and solvent will be recovered to solvent vessel 110. Although the passive mode described above works to perform the closed loop extraction, recovery pump 155 may serve to speed up or enable the recovery process.

Figure 9:
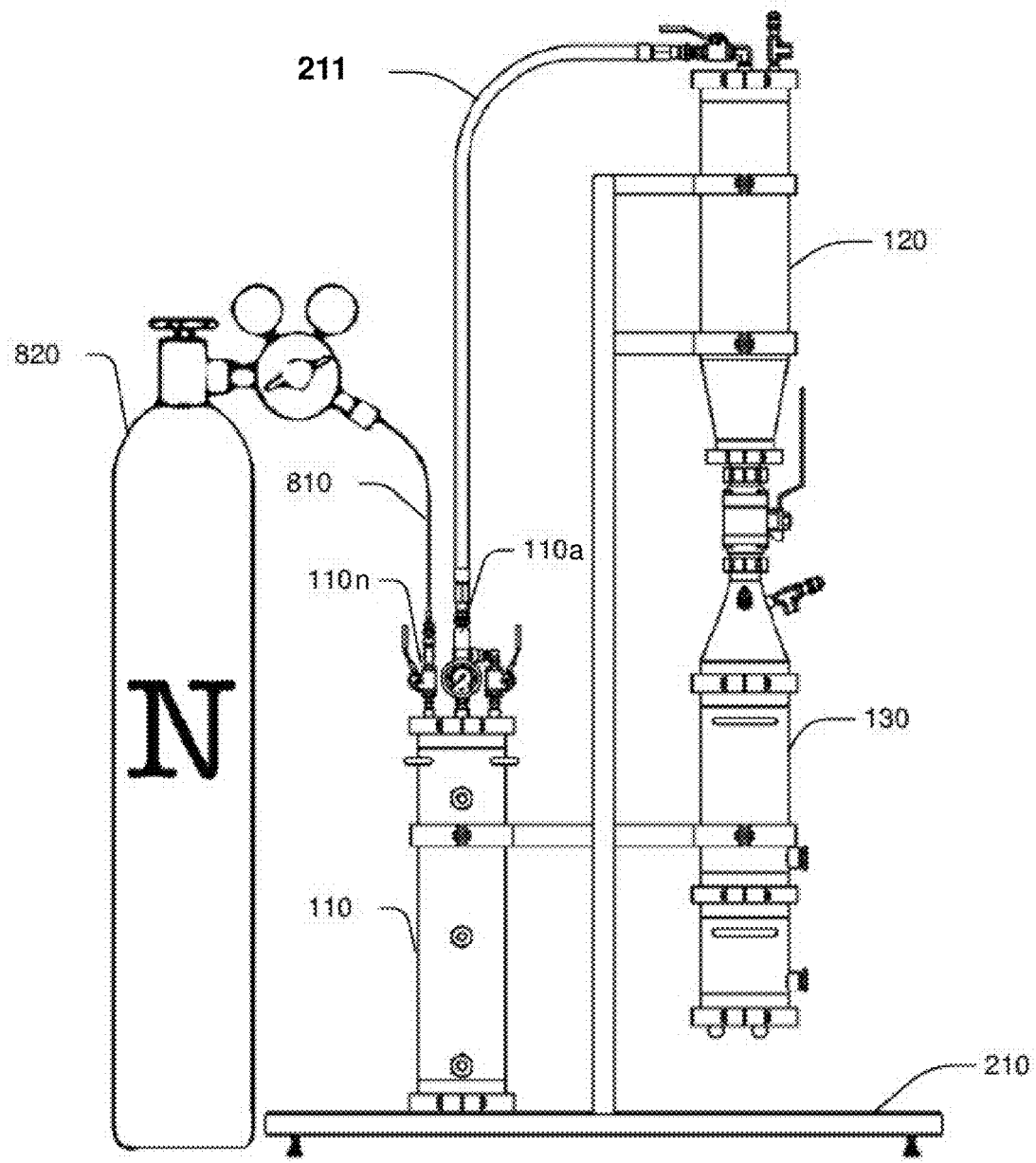
FIG. 9 provides an embodiment of an extraction system including an optional inert gas tank coupled to the solvent vessel provided to facilitate the flow of solvent from the solvent vessel to the extraction vessel.

FIG. 9 illustrates an embodiment of an extraction system in which an inert gas is provided into the solvent vessel to drive solvent into the extraction vessel. A gas cylinder 820, containing an inert gas, for example nitrogen, is coupled through hose 810 to an inert gas input 110n, of the solvent vessel 110. The inert gas input 110n enters the top space of the solvent vessel 110 above the solvent contained in the vessel, thus adding pressure to the headspace above the liquid solvent. This additional pressure helps convey the solvent through the hose 211 to the extraction vessel 120. The additional pressurization boost provided by the inert gas optionally may be utilized to speed the extraction process as further described herein.

Figure 10:
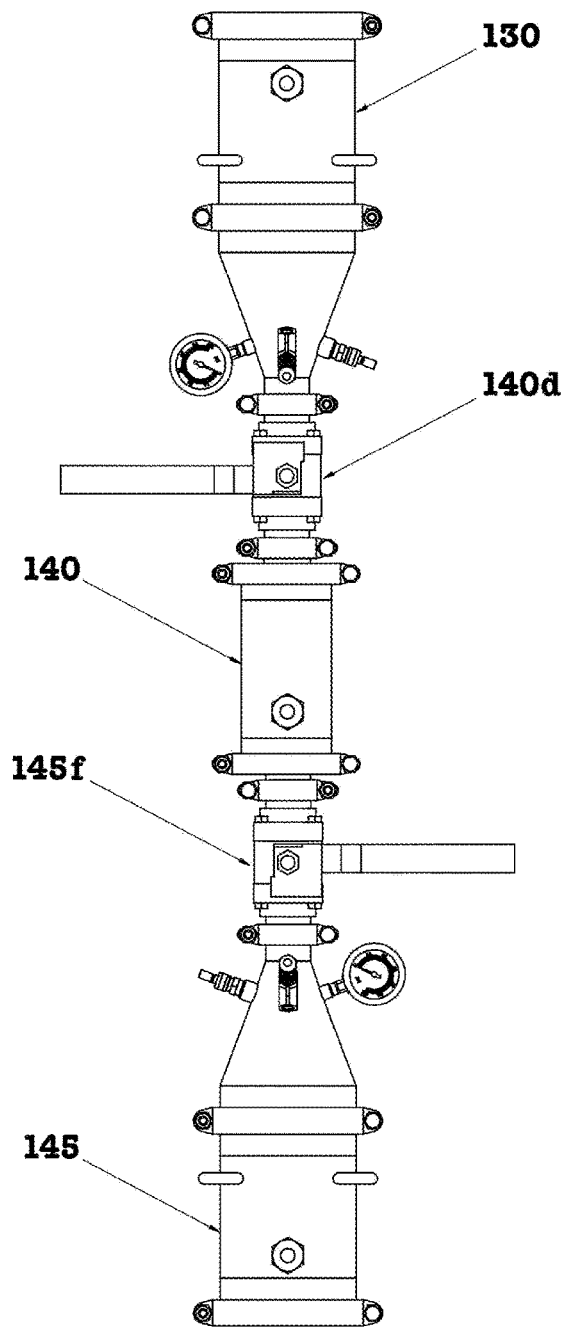
FIG. 10 provides an elevation view of collection vessel coupled to a dewaxing vessel.

FIG. 10 illustrates a stacked combination of components utilized in an embodiment including a dewaxing step. The source vessel 130 has been shown as removed from the previous configurations, inverted, and placed in communication with valve 140 D, which in some embodiments may comprise a ball valve. A dewaxing filter 140 is coupled and interposed between the valve 140 D and valve 145 F, so as to capture and filter out precipitates that have occurred as a result of chilling the collection vessel 130 to a low temperature. The dewaxed collection vessel 145 thus receives a highly purified form of the extract without any undesirable waxy or precipitate substances, which have been removed.

FIGS. 11A and 11B illustrate embodiments of the dewax filter 140. FIG. 11A is an elevation view showing the valve 140d pressure relief 140b and sight glasses 140c. A cut line A-A shown bisecting the dewax filter 140 as illustrated in the cutaway view in FIG. 11 B. In FIG. 11 B, the sock filter 140e as attached to the gasket is shown in an interior volume of the dewax filter 140. The clamps shown on the dewax filter allow internal access to change and or clean the dewax filter elements 140e.

EXAMPLE 2

Passive Closed Loop Solvent Extraction

In terms of a general process discussion the following is an embodiment of a process of the present invention to configure and use the system to obtain extracts from source material such as cannabis. The flowchart shown in FIG. 2 along with this schematic in FIG. 1 and the physical diagram FIG. 3 are useful in following the process in view of the particular drawings shown in FIGS. 4-11B.

The initial step in the process begins by a purging/evacuation and fill step for the solvent vessel. This is accomplished by attaching a vacuum pump to Quick Disconnect B (110k) to pull a substantial vacuum (−25 to −29 HG) on the empty solvent vessel 110 to ensure full evacuation of air.

While pulling a vacuum, the solvent vessel should be cooled to ensure a quick and smooth transfer of the liquid solvent. This will also increase the level of the vacuum and promote the transfer of the solvent into the container.

Once a substantial vacuum has been achieved, the solvent vessel 110 is placed on a refrigerant recovery scale and the empty weight of the vessel is recorded for future reference.

After an empty container weight has been established, a solvent transfer hose such as hose 211 is attached from a source solvent cylinder to Quick Disconnect B on solvent vessel 110. With empty container on refrigerant scale, a tare button is pressed. Valve (110k) attached to Quick Disconnect B and open solvent source valve are opened. Transfer of solvent may now begin. The Solvent vessel 110 is filled to the desired weight. The liquid solvent transfer is monitored through the scale and liquid level sight glasses 110d on the front of the solvent vessel 110.

Once desired solvent weight/level is achieved, solvent transfer is stopped by shutting off source valve first to ensure not to fill and pressurize solvent transfer hose. The solvent vessel 110 is placed in the bucket to hold heating or chilling water and secured to the stand.

Assembly of an embodiment of the present invention may be undertaken as follows, but dimensions mentioned are only exemplary and may comprise larger or smaller dimensions as desired. Place 8 ½" Segment of 6" Tube w/sight glass on 6" Base Plate with 6" n-Buna gasket placed in between ensuring a proper seal. Affix 6" SS Double Bolt Clamp and tighten clamp bolts in an alternating pattern for even distribution of tension. Next, with another 6" n-Buna gasket and 6" Double Bolt Clamp, attach the 14 ½" segment of 6" Tube w/sight glass. (Be sure to orient sight glasses in a convenient position for observation.). Next with another 6" n-Buna gasket and 6" Double Bolt Clamp attach the 6"-2" Conical Reducer to top of incomplete Collection Tube section.

Next using 2" n-Buna gasket and 2" Double Bolt Clamp, attach the "Main Ball Valve w/2" fitting. With the completed collection vessel 130 assembled, place it in the support stand and secure. It is recommended to begin cooling the collection vessel 130 at this point.

Now with collection vessel assembled, an extraction vessel loaded with source material (as described below) can be attached by attaching another 2" gasket and clamp set. Preparation of the extraction vessel 120 is as follows.

Place desired extraction vessel on 4"-2" Reducer Plate with 10.5 cm filter paper sealed on top of 4" n-Buna or nitrile gasket w/stainless steel screen in between to ensure proper filtration and an even seal on the reducer. The filter paper is supported with SS screen below to prevent filter blow-outs. The filter is centered in the gasket to prevent damage to the seal.

After the filters and reducer are secured on the bottom the extraction vessel, the vessel is loaded with finely ground plant material. In one configuration, 100-200 g of material such as finely ground cannabis is placed into the tube of the extraction vessel and firmly but evenly packed to ensure even distribution of solvent through the plant material.

The interior of the column of the extraction vessel is filled up to some distance (such as 2") from the top of the extraction vessel, ensuring headspace for dispersion ball on material tube caps, and allowing room for an even dispersion of solvent.

Loose plant material is removed from the seal on the extraction vessel with a brush. Place extraction vessel cap (e.g. 4" or 6") on corresponding sized extraction vessel (e.g. 4" or 6") with corresponding n-Buna gasket (e.g. 4" or 6") in between to ensure a complete and proper seal. A corresponding Double Bolt Clamp (e.g. 4" or 6") should be affixed and clamp bolts tightened to a desired torque in an alternating pattern for even distribution of tension.

A filter element is coupled between the output of the extraction vessel and the collection valve as described elsewhere.

The solvent is then applied to the source material to obtain an extract from the source material through a passive extraction, a pump assist extraction, or a gas-assist extraction, or a combination thereof.

At this point, the collection vessel should be chilled with coupled extraction vessel to (−20° F. to 20° F.).

Passive closed loop extraction is performed using the aid of hot/cold temperature differences and vacuum pressure to move and recover solvent. To begin this process, the collection vessel 130 should have been chilled (−20° F. to 20° F.) with the extraction vessel 120 attached.

Likewise, the unit should be fully assembled and secured in the support stand prior to operation. The Solvent Transfer Hose 210 should be connected to Quick Disconnect B 120a (FIG. 6) on top of the extraction vessel 120 and the ball valve 127 should be opened. A vacuum should be pulled on the collection vessel 130 and the extraction vessel 120 with the hose assembly attached, to a gauge reading of at least −25 HG.

The Main Ball Valve 127 (FIG. 3) is closed below the extraction vessel 120 (the lever should be horizontal). In some embodiments, the solvent vessel 110 is placed in a warm water bath to build head space pressure that will push the solvent into the next container (the extraction vessel 120). In embodiments, it is advised to not exceed 105° F. in water bath or 50 psi in the solvent vessel 110 during this process. The loose end of solvent transfer hose 211 should be attached to liquid port and Quick Disconnect A 110a (see FIG. 5) on top of solvent vessel 110. The ball valve attached to Quick Disconnect A 110a is opened to start flow of the solvent into the extraction vessel 120 begin the extraction.

In an embodiment, after 3-5 minutes have elapsed and solvent has had time to evenly fill the extraction vessel 120, the main ball valve 127 is opened to allow liquid solvent to flow into the collection vessel 130. Monitor the flow rate and color of the solvent/extract solution via the collection vessel 130 sight glass 130L (see FIG. 7).

The liquid level sight glasses on the solvent vessel 110 and/or a refrigerant recovery scale is used to determine that the desired amount of solvent has left the solvent vessel 110. If some solvent still remains, the solvent vessel 110 may be placed in a warm bath to build pressure and push out the last of the solvent.

Once the desired amount of solvent has been transferred/removed from solvent vessel 110 the valve attached to Quick Disconnect A (110a) is closed and the solvent transfer hose 211 is removed from Quick Disconnect A. The valve on top of extraction vessel 120 is closed and the solvent transfer hose 211 is removed from the Quick Disconnect A. The solvent vessel 110 is placed in a cold bath to reduce the pressure. If the container is cooled to a low enough temperature a vacuum may be achieved.

After the solvent vessel 110 is disconnected, heat is applied to the extraction vessel 120 to help push remaining solvent down into the cold collection vessel 130. This can be done with an approved electric heating blanket or towel soaked in hot water. In some embodiments, it may be helpful to isolate the extraction vessel 120 (via Main Ball Valve 127) to build pressure and give an extra push. Once the extraction vessel 120 maintains a temperature at or above room temperature and there is no visible dripping into the collection vessel 130, the Main Ball Valve 127 can be closed.

A discharge hose is attached to the top of the isolated extraction vessel 120 to relieve pressure. With the discharge hose still attached the Extraction vessel 120 is removed. Remove the Extraction vessel 120 at the connection to the top of the large ball valve. This will keep the 4"-2" SS Reducer Plate and filter attached to the column to protect against a rapid discharge of plant material from the Extraction vessel 120.

When the extraction vessel 120 has been removed, it can be disassembled and emptied. Note that the spent plant material may still have some solvent soaked in it and should be unpacked in a well-ventilated area, promptly removed and safely disposed of.

Once the Extraction vessel 120 is removed recovery can begin by attaching the Solvent Transfer Hose to Quick Disconnect on the Conical Section of the Collection vessel 130, attach the other end of the Solvent Transfer Hose to Quick Disconnect B on the top of the Solvent vessel 110. The bath surrounding the Collection vessel 130 can now be warmed allowing the solvent to evaporate easier; the Solvent vessel 110 should already be cooling. Open Quick Disconnect B on the top of the Solvent vessel 110 allowing transfer of solvent vapor from Collection vessel 130 to Solvent vessel 110.

In some embodiments, recovery of solvent can take anywhere from 40 minutes to an hour and 15 minutes. Be sure to replace the water in the bath as it cools. In some embodiments, the temperature of the bath should not exceed 105° F.

Once the Collection vessel 130 has hit less than 10 psi at 80° F. the recovery can be stopped. (If desired, recovery can continue until the collection vessel 130 reaches vacuum). Disconnect the solvent transfer hose from the Quick Disconnect B on the conical section of the collection vessel 130. Close the valve attached to Quick Disconnect B on the solvent vessel 110 and disconnect the solvent transfer hose. After the collection vessel 130 has been isolated and is holding at less than 10 psi at 80° F. it is safe to depressurize, preferably slowly. When all pressure is relieved it is safe to open up the collection vessel 130 and retrieve the extract from the bottom. Do this by attaching a discharge hose line to collection vessel 130 to let pressure equalize, then open the main ball valve before unbolting clamp on collection vessel 130.

EXAMPLE 3

Recovery Pump Assisted Closed Loop Solvent Extraction

Certain embodiments may achieve improved performance through use of mechanical assistance to aid in speed and recovery of the solvent. A mechanical recovery pump utilizes a vacuum and pressure to pull solvent vapor from a collection vessel and move it to a solvent vessel where it is condensed back into a liquid. Note that if a flammable or explosive solvent is being utilized, the recovery pump 155 must be explosion proof and designed for hydrocarbon use.

The solvent transfer hose 211 should be connected to the Quick Disconnect B 120a on top of the extraction vessel 120 (see FIG. 6), open corresponding ball valve at 120a. Attaching the hose now ensures that a vacuum is pulled on the hose aiding further in solvent transfer.

Attach one end of Solvent Transfer Hose to the IN port on the recovery pump (not supplied) and attach the other end of the hose to the Quick Disconnect on the conical section of the Collection vessel 130. Pull collection vessel 130 and Extraction vessel 120 assembly to a vacuum of at least −25 to 29 HG. The Collection vessel 130 should be chilled (for example −20° F. to 30° F.) with extraction vessel 120 attached. Pull a vacuum in the entire unit. At this point, the solvent vessel 110 is placed in a cold bath (for example −20° F. to 30° F.). Close the main valve 127, below extraction vessel 120.

Attach loose end of solvent transfer hose 210 to Quick Disconnect A (see 110a on FIG. 4) on top of solvent vessel 110. Attach one end of a third solvent transfer hose to the out port on the recovery pump; attach the other end to Quick Disconnect B (see FIG. 4, 110a) on the solvent vessel 110. Start the recovery pump and open the ball valve attached to Quick Disconnect A. Also open ball valve attached to Quick Disconnect B. The valve on the top of the Extraction vessel 120 should already be open. The extraction cycle has now begun.

Monitor the flow rate and color of the solvent/extract solution. After desired results have been achieved close the ball valve attached to Quick Disconnect A stopping the flow of fluid. The recovery cycle has now begun. The recovery pump will now slowly reduce the pressure in the collection vessel 130 and extraction vessel 120 assembly. When the pressure reaches less than 10 psi, close the main ball valve, isolating the extraction vessel 120.

Using a discharge line relieve the remaining pressure from the isolated extraction vessel 120. With the discharge hose still attached begin to remove the Extraction vessel 120. Only remove the extraction vessel 120 at the connection to the top of the main ball valve. This will keep the 4"-2" SS Reducer Plate and filter attached to the column to protect against a rapid discharge of plant material from the Extraction vessel 120.

When the Extraction vessel 120 has been removed, the column can be disassembled and emptied. Note that the spent plant material may still have some solvent soaked in, it should be unpacked in a well-ventilated area, promptly removed and safely disposed of.

After completing previous step, (extraction vessel 120 is unloaded) return to the collection vessel 130 to finish recovery.

Once the collection vessel 130 has hit less than 10 psi at 80° F. the recovery can be stopped. (If desired recovery can continue until the collection vessel 130 reaches desired vacuum). Disconnect the solvent transfer hose 211 from the Quick Disconnect on the conical section of the collection vessel 130. Close the valve attached to Quick Disconnect B on the solvent vessel 110 and disconnect the second solvent transfer hose.

After the collection vessel 130 has been isolated and is holding at less than 10 psi at 80° F., it is safe to depressurize slowly. When all pressure is relieved it is safe to open up the collection vessel 130 and retrieve the extract from the bottom. Do this by attaching a discharge hose line to collection vessel 130 to let pressure equalize, then open the main ball valve before unbolting clamp on collection vessel 130.

EXAMPLE 4

Nitrogen Assisted Closed Loop Solvent Extraction

Nitrogen assisted operation utilizes pressure from an inert gas to push solvent through the extraction vessel 120. Using inert gas as a pressure source allows the temperature of the solvent to be reduced. Beginning operation the unit should already be assembled and secured in the support stand. Connect solvent transfer hose to Quick Disconnect A on top of the Extraction vessel 120, open the corresponding ball valve. Pull vacuum on collection vessel 130 and extraction vessel 120 assembly. (Attaching the hose now ensures that a vacuum is pulled on the hose aiding further in solvent transfer)

Be sure the collection vessel 130 is cool (to desired temperature between −20° F. to 20° F.) with extraction vessel 120 attached. Pull the entire unit (excluding solvent tank) to at least −25 to 29 HG. Be sure that the solvent vessel 110 is in a cold bath (for example −20° F. to 20° F.). Attach a hose from the nitrogen regulator to the Nitrogen Port (see FIG. 3) on the solvent vessel 110 and open valves. Fill the solvent vessel 110 with 10-30 psi of nitrogen pressure. Close main ball valve 127 below extraction vessel 120.

Attach loose end of Solvent Transfer Hose to Quick Disconnect A on top of Solvent vessel 110. Open ball valve attached to Quick Disconnect A to start flow and begin the extraction. After 3-5 minutes have elapsed and solvent has had time to evenly fill the extraction vessel 120, open the large ball valve to allow flow into the collection vessel 130. Monitor the flow rate and color of the solvent/extract solution.

After a desired amount of flush time cut off nitrogen supply to Solvent vessel 110 and close the valve attached to Quick Disconnect A, stopping liquid flow. Close main ball valve 127 isolating the collection vessel 130. To depressurize the collection vessel, use the discharge hose to Quick Connect to the conical section of the collection vessel to discharge nitrogen.

After reducing pressure re-open the large main ball valve allowing leftover solvent to flow into the collection vessel 130. Sometimes it may be helpful to isolate the extraction vessel 120 to build pressure and give an extra push. Once the extraction vessel 120 maintains a temperature at or above room temperature and no there is no visible dripping into the collection vessel 130 the main ball valve can be closed.

Attach a discharge hose to the top of the isolated extraction vessel 120 to relieve pressure. With the discharge hose still attached begin to remove the extraction vessel 120. Only remove the extraction vessel 120 at the connection to the top of the main ball valve 127. This will keep the 4"-2" SS Reducer Plate and filter attached to the tube to protect against a rapid discharge of plant material from the extraction vessel 120.

When the extraction vessel 120 has been removed, it can be disassembled and emptied. Note that the spent plant material may still have some solvent soaked in it and should be unpacked in a well-ventilated and promptly removed and safely disposed of. The Nitrogen pressure will still need to be relieved from collection vessel 130 with discharge hose line before recovery may begin. Once the extraction vessel 120 is removed recovery can begin by attaching the Solvent Transfer Hose to Quick Disconnect on the conical section of the collection vessel 130 (see FIG. 5A), attach the other end of the solvent transfer hose 211 to Quick Disconnect B on the top of the solvent vessel 110.

The bath surrounding the collection vessel 130 can now be warmed allowing the solvent to evaporate; the solvent vessel 110 should already be cooling. Open the ball valve on the top of the solvent vessel 110 allowing transfer of solvent vapor from Collection vessel 130 to solvent vessel 110. In some embodiments, recovery of solvent can take anywhere from 40 minutes to an hour and 15 minutes. Be sure to replace the water in the bath as it cools but the bath should not exceed 105° F. Once the collection vessel 130 has hit less the 10 psi at 80° F. the recovery can be stopped. (If desired recovery can continue until the collection vessel 130 reaches and vacuum) Disconnect the Solvent Transfer Hose from the Quick Disconnect on the conical section of the collection vessel 130. Close the valve on attached to Quick Disconnect B on the Solvent vessel 110 and disconnect the solvent transfer hose 211.

After the collection vessel 130 has been isolated and is holding at less than 10 psi at 80° F. it is safe to depressurize slowly. When all pressure is relieved it is safe to open up the collection vessel and retrieve the extract from the bottom. Do this by attaching a discharge hose line to the Quick Connect of the collection vessel 130 to let pressure equalize, then open the main ball valve before unbolting clamp on collection vessel 130.

EXAMPLE 5

Dewaxing Purification

Dewaxing, (or 'Dwaxing') in terms of extraction, is a technique to clarify oil produced with higher concentrations of undesirables, and a way to increase the potency of the final product. In some embodiments, it means to cool the solvent solution with dissolved solute extracts for a given amount of time until waxes and other constituents begin to form a precipitate within the solution so they may be filtered out. These constituents are physically and chemically different from the oil and are currently considered undesirable. After precipitation the undesired compounds are physically removed by filtration. The resulting product is now considered "dewaxed".

Embodiments of the present invention have the ability to dewax/winterize the extraction product, with additional configuration from the base units shown in FIG. 1. In addition to collection vessel 130, a second collection vessel 145 of equal size to the other vessel 130 will be utilized (for example, sizes may include a 1 lb, 3 lb, or 5 lb collection vessel 130), and an exemplary 8"×4" Dewax filtration column using a 45 micron stainless steel Dewaxing filter, an 4" double bolt clamp, several extra N-buna gaskets.

Run the system as described above, but stop at the point where the solvent/solute extract solution is fully contained inside the bottom collection vessel 130.

After the extraction vessel 120 has been removed from the collection vessel 130, the full collection vessel 130 can be removed from the stand. The reducer should be removed from the extraction vessel 120 to be cleaned and replaced back on top of the main ball valve 127 on the collection vessel 130 with a n-Buna gasket and double bolt clamp.

The full collection vessel 130 can then be cooled to a sub-zero temperature using ice or dry ice, chiller or a spark/explosion proof rated freezer for a desired length of time, and the extraction product is now considered to be 'dewaxing'.

While the product is dewaxing, assembly of the dewax filtration column on top of your the second collection vessel 145 may be undertaken using an n-Buna gasket and double bolt clamp.

The 45 micron stainless steel dewaxing filter should be placed into the top of the dewax filtration column. Optionally, a snap-on cover or cellophane may be used to keep the filter free from debris. Close the ball valve and use vacuum pump to achieve collection vessel 130 vacuum in order to reduce vacuum time.

Chill the second collection vessel 145 with the dewax filtration column attached down to the same temperature or colder of the first collection vessel 130, for example for two hours, before filtration to ensure even chilled temperature throughout the steel. This will prevent the solvent from warming up upon transfer, which could create vapor pressure and slow or stop the filtration process.

Once the dewax solution in the original collection vessel 130 has been chilled for a desired period of time, remove the empty collection vessel 130 (with dewax filtration column attached) from the freezer and secure it in position to receive solution. Remove the solution filled collection vessel 130 from the freezer, rotate 180 degrees, and attach it to the top of the filtration column using a 4" double bolt clamp. (Be sure to remove plastic cover/cellophane wrap). After the solution filled collection vessel 130 is attached to the top of the frozen empty collection vessel 130, open the ball valve of the receiving lower/empty container. This will expand the space of the current vacuum. Additional vacuum reduction can then continue on the lower half of the system using an HVAC pump. Time is of the essence during this stage because dewaxed material can warm up while a vacuum is being pulled, but a vacuum cannot be created on the filtration column until both collection vessels 130, 145 are attached to isolate the system from the external environment.

Now that vacuum has been achieved in the lower collection vessel 145 with the lower main ball valve open, the upper ball valve can be opened to release the solvent/oil/wax extract solution, allowing it to pass through the dewax filter and collect in the bottom of the empty collection vessel 145. If the user has access to an approved, explosion proof solvent recovery pump, the filtration process can be assisted by attaching the intake of the recovery pump to the quick connect on the lower collection vessel 130, and attaching the output of the recovery pump to your solvent vessel 110, using the vacuum to pull the solution through the filter.

Now with the dewaxed solution completely transferred into the lower collection vessel 145, close both main ball valves, isolating the 2 collection vessels 130, 145 from one another. The user can now remove the upper collection vessel 130 and dewax filtration column for cleaning of wax and solids. Even after clamps have been removed, the vacuum on the upper collection vessel 130 may be removed in order to remove the pieces on the unit, which can be done by depressing the male Quick Connect on the conical reducer or by attaching a pressure relief hose to the Quick Connect. At this point solvent recovery may be undertaken as performed above in relation to passive operation from the collection vessel 145 as normal.

Changes and modifications may be made to the disclosed embodiments without departing from the scope of the present invention. These and other changes or modifications are intended to be included within the scope of the present invention, as expressed in the following claims.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, and method steps set forth in the present description. As will be obvious to one of skill in the art, methods and devices useful for the present methods can include a large number of optional composition and processing elements and steps.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when compositions of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method for closed loop extraction of oils from plant material, said method comprising the steps of:
   providing an extraction system comprising:
      a solvent vessel for containing a solvent;
      an extraction vessel removably connected to said solvent vessel; and
      a collection vessel removably connected to said extraction vessel and removably connected to said solvent vessel, wherein said collection vessel is positioned gravitationally lower than said extraction vessel;
   filling said solvent vessel with said solvent;
   providing a source of inert gas in fluid communication with said solvent vessel, flowing said inert gas into said solvent vessel while said solvent is in said extraction vessel to promote the flow of said solvent into said collection vessel;
   heating said solvent vessel, thereby flowing said solvent from said solvent vessel into said extraction vessel, wherein said solvent extracts oils from said plant material;
   heating said extraction vessel;
   cooling said collection vessel to a temperature lower than a temperature of said solvent vessel, thereby flowing said solvent and oils into said collection vessel from the extraction vessel; and
   heating said collection vessel to evaporate said solvent thereby returning at least a portion of said solvent to said solvent vessel and leaving at least a portion of said oils in said collection vessel.

2. The method for closed loop extraction of oils from plant material of claim 1, wherein said solvent flows through said extraction system by a differential pressure between said solvent vessel, said extraction vessel and said collection vessel.

3. The method for closed loop extraction of oils from plant material of claim 1, wherein said solvent flows through said extraction system without a pump.

4. The method for closed loop extraction of oils from plant material of claim 1, wherein said step of filling said solvent vessel further comprises evacuating said solvent vessel to pressure less than or equal to −25 inches of Mercury.

5. The method for closed loop extraction of oils from plant material of claim 1 wherein said step of evaporating said solvent returns greater than 95% of said solvent to said solvent vessel.

6. The method for closed loop extraction of oils from plant material of claim 1 further comprising:
   providing a recovery pump operationally connected to said collection vessel to force gas from said collection vessel to said solvent vessel.

7. The method for closed loop extraction of oils from plant material of claim 1, wherein said inert gas is argon, nitrogen or a combination thereof.

8. The method for closed loop extraction of oils from plant material of claim 1 further comprising:
   cooling said collection vessel, thereby solidifying waxes in said at least a portion of said oils;
   coupling said collection vessel to a dewaxing vessel, wherein said dewaxing vessel is at a lower temperature than said collection vessel; and
   flowing said at least a portion of said oils from said collection vessel to said dewaxing vessel through a filter, thereby removing said solidified waxes.

9. The method for closed loop extraction of oils from plant material of claim 8, wherein said filter is a 45 micron or smaller filter.

10. The method for closed loop extraction of oils from plant material of claim 1 wherein said step of flowing said solvent from said solvent vessel to said extraction vessel is accomplished by heating said solvent vessel to between 20° C. and 40° C. and cooling said collection vessel to a temperature below −5° C. thereby generating a pressure differential.

11. The method for closed loop extraction of oils from plant material of claim 1, wherein said step of heating said collection vessel to evaporate said solvent heats said collection vessel to between 20° C. and 40° C.

12. The method for closed loop extraction of oils from plant material of claim 11, wherein said step of heating said collection vessel said collection vessel is heated for between 40 and 80 minutes.

13. The method for closed loop extraction of oils from plant material of claim 8, wherein said step of cooling said collection vessel to solidify waxes cools said collection to less than 0° C.

14. The method for closed loop extraction of oils from plant material of claim 1, wherein said solvent is an alkane, an alkene, an alkyne or a combination thereof.

15. The method for closed loop extraction of oils from plant material of claim 14, wherein said solvent is ethane, ethene, propane, propene, butane, butene, pentane, pentene or a combination thereof.

16. The method for closed loop extraction of oils from plant material of claim 15, wherein said solvent is n-butane.

17. A method for closed loop extracting and purifying oils and from plant material, said method comprising the steps of:
  providing an extraction system comprising:
  a solvent vessel for containing a solvent;
  an extraction vessel removably connected to said solvent vessel;
  a collection vessel removably connected to said extraction vessel and removably connected to said solvent vessel, wherein said collection vessel is positioned gravitationally lower than said extraction vessel;
  providing a source of inert gas in fluid communication with said solvent vessel, flowing said inert gas into said solvent vessel while said solvent is in said extraction vessel to promote the flow of said solvent into said collection vessel;
  a dewaxing vessel removably connected to said collection vessel; and
  a filter, positioned in between said collection vessel and said dewaxing vessel;
  evacuating said solvent vessel to a pressure less than or equal to −25 inches of Mercury;
  filling said solvent vessel with said solvent;
  heating said solvent vessel, thereby flowing said solvent from said solvent vessel into said extraction vessel, wherein said solvent extracts oils from said plant material;
  heating said extraction vessel;
  cooling said collection vessel to a temperature lower than a temperature of said solvent vessel, thereby flowing said solvent and oils into said collection vessel from the extraction vessel;
  heating said collection vessel to evaporate said solvent thereby returning at least a portion of said solvent to said solvent vessel and leaving at least a portion of said oils in said collection vessel,
  cooling said collection vessel to less than 0° C. thereby solidifying waxes in said oils; and
  cooling said dewaxed vessel to a temperature lower than said collection vessel, thereby flowing said oils from said collection vessel through said filter to said dewaxed vessel and removing waxes from said oils.

* * * * *